US010778658B1

(12) United States Patent
Reddy

(10) Patent No.: US 10,778,658 B1
(45) Date of Patent: Sep. 15, 2020

(54) COMMUNICATION SERVER AND METHOD OF SECURED TRANSMISSION OF MESSAGES

(71) Applicant: Tanla Digital Labs Private Limited, Hyderabad, Telangana (IN)

(72) Inventor: Konda Venkata Papi Reddy, Telangana (IN)

(73) Assignee: Tanla Digital Labs Private Limited, Hyderbad, Telangana (IN)

( * ) Notice: Subject to any disclaimer, the term of this patent is extended or adjusted under 35 U.S.C. 154(b) by 0 days.

(21) Appl. No.: 16/780,102

(22) Filed: Feb. 3, 2020

(51) Int. Cl.
*H04L 29/06* (2006.01)
*H04L 9/14* (2006.01)
*H04L 9/30* (2006.01)

(52) U.S. Cl.
CPC ............ *H04L 63/0471* (2013.01); *H04L 9/14* (2013.01); *H04L 9/30* (2013.01); *H04L 63/0435* (2013.01); *H04L 63/0478* (2013.01)

(58) Field of Classification Search
CPC ... H04L 63/0471; H04L 63/0478; H04L 9/30; H04L 63/0435; H04L 9/14
See application file for complete search history.

(56) References Cited

U.S. PATENT DOCUMENTS

| 8,879,728 B2 | 11/2014 | MacMillan et al. | |
| 9,756,021 B2 | 9/2017 | Favero | |
| 2003/0061481 A1* | 3/2003 | Levine | H04L 9/0836 713/163 |
| 2004/0068649 A1 | 4/2004 | Haller et al. | |
| 2006/0123226 A1* | 6/2006 | Kumar | H04L 63/20 713/154 |
| 2009/0265552 A1 | 10/2009 | Moshir et al. | |

FOREIGN PATENT DOCUMENTS

| EP | 1569482 A1 | 8/2005 |
| EP | 2401850 A2 | 1/2012 |

* cited by examiner

*Primary Examiner* — Huan V Doan
(74) *Attorney, Agent, or Firm* — Bret E. Field; Bozicevic, Field & Francis LLP

(57) ABSTRACT

The present disclosure relates to a communication server and a method for secured transmission of messages from an enterprise server to a telecom server for delivering to end users. The enterprise server comprises a first gateway hosted therein to encrypt and transmit the encrypted messages to the communication server. The communication server comprises a routing unit for routing the encrypted messages from the enterprise server to the user devices via the telecom server. The telecom server comprises a second gateway hosted therein to retrieve the encrypted messages. The user device comprises a third gateway hosted therein to retrieve the encrypted messages from the telecom server in case the decryption is taking place at user device.

25 Claims, 10 Drawing Sheets

COMMUNICATION SERVER AND METHOD OF SECURED TRANSMISSION OF MESSAGES

TECHNICAL FIELD

The present disclosure generally relates to secure transmission and routing of Application-to-Person (A2P) messages, and more particularly to, system and method to ensure data privacy and data security during secure transmission of messages, including but not limited to, short message service, multimedia messaging service, rich communication service messages, over-the-top media services, push notifications etc.

BACKGROUND

Conventional messaging such as person-to-person (P2P) messaging is generally defined as a two-way messaging conversation between two users. Examples of the P2P messaging include text communications between a customer and a support agent and conversations between two users. Evolving from purely consumer communication such as P2P messaging, the text communications are becoming more common between enterprises and users, such as Application-to-Person (A2P) messaging and Person-to-Application (P2A) messaging and is becoming preferred mode of commercial communication. Application-to-Person (A2P) messaging is one-way message in which recipients are not expected to reply. Enterprise applications use an Application Program Interface (API) to send and receive text messages. A few examples of the A2P messaging includes, but are not limited to, mobile marketing messages, appoint reminders, alerts & notifications, voting & survey, and authentication messages such as one-time passwords (OTPs) and many more.

The current eco system of A2P and P2A messaging includes a variety of middlemen such as third party (s), gateway providers, and resellers before message sent from an enterprise application reaches the end users. In the present A2P and P2A messaging scenario, clear content of the message is transmitted from an enterprise to the end users, wherein the one or more middlemen are able to view the clear content of the message, which results in compromising privacy and security of the end user's sensitive information such OTPs, bank balance details, shopping transactions, medical reports, etc. resulting into user profiling and data leakage, in turn leading to fraud and/or theft and cross marketing. The availability of the clear content of end user's data (such as OTP) related to the end user during any financial transactions with the middlemen poses a great threat to user privacy.

In one exemplary A2P scenario, when any financial institution or e-commence platforms provide any gift coupons or price discount to only to a particular set of users. The availability of clear content of gift coupons or price discount with the middlemen may result in sending the promotional offer's to other users through grey route which result in breach of privacy of the financial institutions or e-commence platforms.

In another exemplary A2P scenario, visibility of clear content of the message transmitted from social media such as password reset link may pose a great risk to user privacy and may also result to hacking of social media accounts of the end user.

In one exemplary P2A scenario, when the messages are transmitted from the end user to the application, the middlemen will be able to make profile of the end user, by reading the clear content of the message transmitted, which is a leakage of personal sensitive information, thereby knowing end user's profile such as food type preferences, shopping interests, user bank details, and other personal information of the end user. This results into breach of the end user's data privacy, thereby making the end user susceptible to endless promotional messages, calls, and security attacks on other personal information such as password of the bank related to the end user.

In another exemplary P2A scenario, if there is a message related to declining of a credit card of the end user during a payment attempt at any point of sale. The visibility of clear content of this message with the middlemen may lead to fraud call/SMS through black route providing a fraud payment link for completing the incomplete payment.

In yet another exemplary P2A scenario, during DTH activation, channel subscription, and voting for various reality TV shows, the end user typically send messages from his/her mobile to the enterprise application, in which clear content of the message is visible to the middlemen, thereby resulting in risk of user profiling and also manipulation of the voting.

As mentioned in some of the above scenarios, there exist a need for secure delivery of messages transmitted from enterprise to end user and vice versa. However, the present existing solutions support secure messaging by encrypting messages at a messaging server before forwarding the encrypted message to a smart phone. The smart phone uses an application to decrypt messages that have been encrypted prior to transmission. The encryption and decryption are performed generally by a single symmetric key which is visible to both the messaging server and the smart phone. This also pose a risk to entire data included in the messages if the single symmetric key that is used to encrypt and decrypt the messages is compromised.

Therefore, there arises a need for a secured communication platform for enabling secure transmission of messages using multiple keys, which the multiple keys and message content is not visible to any entity in the communication chain.

SUMMARY

Accordingly, in an aspect of the present disclosure, a communication server for secured transmission of messages from one or more enterprise servers to one or more user devices. The communication server comprises a first gateway hosted at the one or more enterprise servers for encrypting the messages and a routing unit for routing the encrypted messages from the one or more enterprise servers, to the one or more user devices via one or more telecom servers. The communication server further comprises a second gateway hosted at the one or more telecom servers for retrieving the encrypted messages from the routing unit.

Another aspect of the present disclosure is a method for secured transmission of messages from one or more enterprise servers to one or more user devices. The method comprises receiving the messages from one or more enterprise servers, wherein the first gateway is hosted at the one or more enterprise servers, encrypting the messages, and routing the encrypted messages from the one or more enterprise servers, to the one or more user devices via one or more telecom servers. The method further comprises retrieving the encrypted messages from the routing unit, wherein the second gateway is hosted at the one or more telecom servers. The user device comprises a third gateway hosted therein to retrieve the encrypted messages from the telecom server in case the decryption is taking place at user device.

The device, and associated method of the present disclosure overcome one or more of the shortcomings of the prior art. Additional features and advantages may be realized through the techniques of the present disclosure. Other embodiments and aspects of the disclosure are described in detail herein and are considered a part of the claimed disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 1:
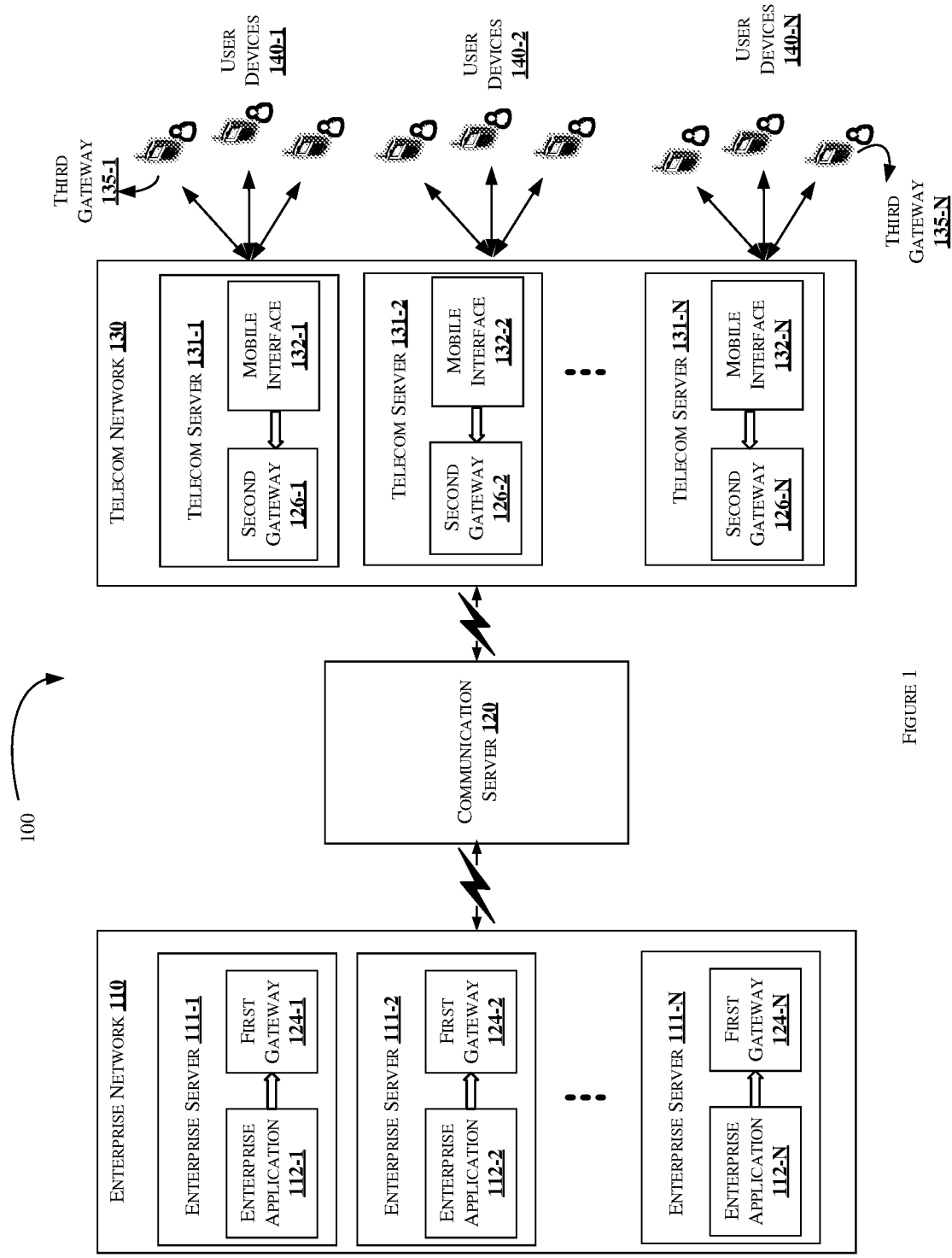
FIG. 1 illustrates an exemplary architecture of a system 100 in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of a system 100 according to an aspect of the present disclosure. As shown in FIG. 1, the system 100 comprises one or more components configured for secured transmission of messages. In one embodiment, the exemplary system 100 comprises an enterprise network 110, a communication server 120, and a telecom network 130 associated to a plurality of user devices 140-1, 140-2, . . . , 140-N (collectively referred to an user devices 140) coupled via a network for a secured transmission of messages. In one embodiment, messages transmitted from the enterprise network 110 to the telecom network 130 for delivering the messages to the end users 140 are known as Application-to-Person (A2P) messages. In another embodiment, messages transmitted from at least one of the end users 140 through the telecom network 130 to the enterprise network 110 are known as Person-to-Application (P2A) messages. The enterprise network 110 comprises one or more enterprise servers 111-1, 111-2, . . . , 111-N (collectively referred to enterprise servers 111). Each of the enterprise servers 111-N comprises an enterprise application 112-N to transmit the messages securely to one or more end users 140. The telecom network 130 comprises one or more telecom servers 131-1, 131-2, . . . , 131-N (collectively referred to telecom servers 131). Each of the telecom servers 131-N comprises a mobile interface 132-N to transmit the messages securely to one or more end users 140. Each of the enterprise servers 111, the telecom servers 131, and the user devices 140 include a certificate authority unit to generate at least a pair of public and private key. The enterprise network 110, the telecom network 130, and user devices 140 includes a plurality of gateways that are hosted by the communication server 120 for secured routing of A2P and P2A messages. The plurality of gateways includes at least a first gateway 124-1, 124-2, . . . , 124-N; a second gateway 126-1, 126-2, . . . , 126-N; and a third gateway 135-1, 135-2, . . . , 135-N that are hosted at the enterprise network 110, the telecom network 130, and user devices 140 that enables secure transmission of the messages. The plurality of gateways 124, 126, and 135 are deployed either on-premise or on-cloud through the communication server 120. In one embodiment, the system 100 is a cloud-enabled communication system in which a cloud enabled communication server 120 is deployed. In one embodiment, the first gateway124, the second gateway 126, and the third gateway 135 are hosted by the communication server 120 and are hosted at the enterprise network 110, at the telecom network 130, and at user devices 140 respectively through container based implementation models that allows one or more application packages to be installed at the enterprise network 110, at the telecom network 130, and at the user devices 140 premises. In one embodiment, each of stakeholders including, but not limited to, enterprise servers 110, telecom servers 130, user devices 140, one or more third parties (not shown), and service vendors (not shown) must register on the communication server 120 through a predefined registration and validation process. After the successful registration, each of the stakeholders may initiate one of A2P and P2A message transmission request to the communication server 120. Each of the first gateway 124 associated with the enterprise server 111 transmits encrypted messages to the communication server 120 via a HTTPS protocol, wherein the encrypted messages are queued by the communication server 120 and are pulled by the one of the second gateway 126. Further, the second gateway 126 decrypts the encrypted messages and transmits the messages to the telecom servers 131 via SMPP protocol which is subsequently transmitted to the user devices 140. Upon reception of the messages by at least one of user devices 140, the user devices 140 generates a delivery confirmation and the telecom servers 131 generates a delivery confirmation receipt, alternatively known as call data record (CDR), which is transmitted to the second gateway 126 via SMPP protocol. The second gateway 126 encrypts the delivery confirmation receipts and are transmitted to the communication server 120. The encrypted delivery confirmation receipts are queued by the second gateway 126 and are pulled by the communication server 120. The communication server 120 further pushes the encrypted delivery confirmation receipts to the first gateway 124 and are decrypted at the first gateway 124. The decrypted delivery confirmation receipts are then delivered to the enterprise server 111 via SMPP or HTTP protocol. In one embodiment, all the communications from the enterprise network 110 to the telecom network 130 and vice versa is transported through the transport layer TCP/IP. In one embodiment, all the communications from the telecom network 130 to the user devices 140 and vice versa is transported through a telecom channel. The communication server 120 does not hold any contents for viewing, instead simply pushes the messages to the concerned recipient. The servers mentioned herein are assumed without limitation to be implemented on one or more computers or other processing elements associated with the enterprise implementing the enterprise network. A given "server" as the term is used herein is therefore intended to include any arrangement of one or more computers or other processing elements configurable to provide the associated processing functionality.

Figure 2:
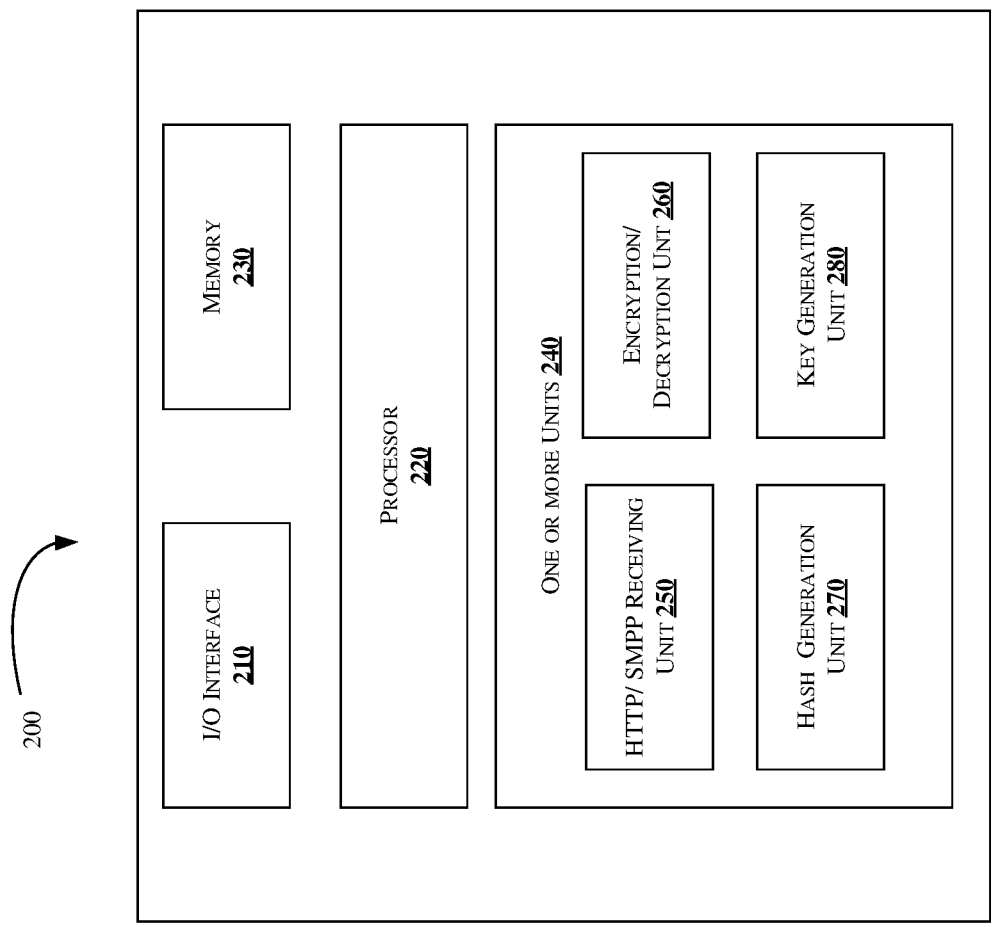
FIG. 2 illustrates a detailed block diagram of an exemplary first gateway associated with one or more enterprise servers in accordance with some embodiments of the present disclosure.

FIG. 2 illustrates a detailed block diagram of an exemplary first gateway associated with one or more enterprise servers in accordance with some embodiments of the present disclosure.

In an implementation, the first gateway 200 may include an I/O interface 210, a processor 220, a memory 230, and one or more units 240. The I/O interface 210 may be configured to receive messages from the corresponding enterprise servers 111. Further, the I/O interface 210 may be configured to transmit encrypted messages to the communication server 120. The processor 220 may be configured to perform one or more functions of the first gateway 124 for performing encrypting and decrypting operations. The memory 230 may be communicatively coupled to the processor 220 and may store one or more data related to the first gateway 124.

In some implementations, the first gateway 124 may include units 240 for performing various operations in accordance with embodiments of the present disclosure. In an embodiment, data may be stored within the memory 230 and may include, without limiting to, at least one of public key of each telecom server 131 and public key of each user device 140, and a pair of keys of corresponding enterprise server 111. In one embodiment, at least one of public key of each telecom server 131 and public key of each user device 140 is stored in a cache memory 230.

In one embodiment, at least one of public key of each telecom server 131 and public key of each user device 140 is retrieved from a communication server 120 and stored in the cache memory for a certain time period.

In one embodiment, a pair of keys of corresponding enterprise servers 111 is retrieved includes a public key and private key. Further, according an embodiment of the present disclosure, keys can be rotated for enhancing safety. During such dynamic change/rotation of the pair of keys generated at the enterprise server 111, each of the second gateway 126 and the third gateway 140 updates the corresponding public key associated with the enterprise server 111 only after a cache is expired. Thus, the first gateway 124 maintains the present and previous key pairs so that the first gateway 124 can decrypt messages encrypted from one of the second gateway 126 and the third gateway 140 using a previous public key.

In one implementation, the units 240 may be stored as a part of the processor 220. In another implementations, the units 240 may be communicatively coupled to the processor 220 for performing one or more functions of the first gateway 200. The units 240 may include, without limiting to, HTTP/SMPP receiving unit 250, encryption/decryption unit 260, hash generation unit 270, and key generation unit 280.

As used herein, the term unit refers to an application specific integrated circuit (ASIC), an electronic circuit, a processor (shared, dedicate, or group) and memory that execute one or more software or firmware programs, a combination logic circuit, and/or other suitable components that provide the described functionalities of the first gateway 124.

In an embodiment, the HTTP/SMPP receiving unit 250 may be used to receive the messages transmitted from corresponding enterprise server 111 using one of the HTTP and SMPP protocol.

In an embodiment, the encryption/decryption unit 260 may be used to perform one of encryption and decryption operations.

During encryption operation, the encryption/decryption unit 260 of the first gateway 124 is configured to encrypt the messages received from the enterprise server 111 using a random symmetric session key generated. The encryption/decryption unit 260 is further configured to encrypt the symmetric session key using at least one public key of one or more telecom servers 131 and/or the one or more user devices 140 received from the communication server 120 and/or from the cache memory 230. In one embodiment, the encryption/decryption unit 260 is configured to encrypt the symmetric key using at least one public key provided by the one or more user devices, when the at least one public key provided by the one or more user devices 140 is available in a key storage unit of the communication server 120 and/or in the cache memory 230. In one embodiment, the encryption/decryption unit 260 is configured to the encrypt the symmetric key using at least one public key provided by the one or more telecom servers 131, when the at least one public key provided by the one or more user devices 140 is not available in a key storage unit of the communication server 120.

During decryption operation, the encryption/decryption unit 260 of the first gateway 124 is configured to decrypt encrypted symmetric session key of at least one of a second gateway 126 and a third gateway 135 received from the communication server 120 using at least one private key of corresponding enterprise server 111 and to decrypt one or more encrypted messages received from one of the one or more telecom server 131 and one or more user devices 140 using the decrypted symmetric session key.

In an embodiment, the hash generation unit 270 is configured to generate hash value for the messages transmitted from the corresponding enterprise server 111 and also to generate hash values for public keys of one or more telecom server 131 and/or the one or more user devices 140.

In an embodiment, the key generation unit 280 is configured to generate a random symmetric session key for encrypting messages received from corresponding enterprise server 111. In one embodiment, the key generation unit 280 is also configured to generate a pair of public and private keys for corresponding enterprise servers 111.

In an embodiment, the encryption takes place at the enterpriser server 111 level and the encrypted messages are transmitted to the communication server 120.

In operation, in case of A2P message scenario, the messages need to be transmitted from the enterprise network 110 to the one or more user devices 140 through the telecom network 130. The enterprise application 112 initiates a request for A2P message transmission to the communication server 120. The enterprise application 112 also invokes the first gateway 124 deployed in the corresponding enterprise server 111. On successful acknowledgement by the communication server 120 to allow the request to send A2P messages, the messages are received by the first gateway 124. The first gateway 124 generates a message packet from the received messages, wherein the message packet comprises metadata, and encrypted message content that is encrypted using the symmetric session key and a message hash. The first gateway 124 then encrypts the symmetric session key using at least one public key provided by the one or more telecom servers 131 and/or the one or more user devices 140. In one embodiment, at least one public key provided by the one or more telecom servers 131 and the one or more user devices 140 is retrieved from the communication server 120. In one embodiment, at least one public key provided by the one or more telecom servers 131 and the one or more user devices 140 is retrieved from the cache memory 230. As the first gateway 124 is unaware of recipient telecom server through which the A2P messages are delivered to the end users 140, the first gateway 124 encrypts the symmetric session key with each public key of the telecom server 131 and/or user device 140 and then generates hash values of each public key of telecom servers 131 and/or user device 140. The first gateway 124 then transmits the encrypted message to the communication server 120 which consists of metadata which is unencrypted, encrypted message content & message hash, and a plurality of encrypted symmetric key and hash values of the at least one public key provided by the one or more telecom servers 131 and/or the one or more user devices 140. In one embodiment, the symmetric session key is encrypted using at least one public key provided by the one or more user devices 140 when the at least one public key provided by the one or more user devices 140 is available in the communication server 120 and/or in the cache memory 230. In another embodiment, the symmetric session key is encrypted using at least one public key provided by the one or more telecom servers 131 when the at least one public key provided by the one or more user devices 140 is not available in the communication server 120. In one embodiment, each of the encrypted message is transmitted along the metadata information including a source identification number, an end user identification number, header of the messages, and information about decryption either at a second gateway or at the third gateway, as provided the routing unit.

In operation, in case of P2A message scenario, the messages transmitted from the end user 140 via the telecom network 130 to the enterprise network 110. The first gateway 124 receives unencrypted metadata, encrypted message content and message hash, and a plurality of encrypted symmetric session keys which are encrypted with each of the enterprise server's public key and hash values of at least one public key of the enterprise servers 111. The first gateway 124 retrieves public key of the corresponding enterprise server 111 and compares hash value of the public key with the plurality of hash values received. If the hash value match, then the first gateway 124 decrypts the encrypted symmetric session key with a private key corresponding to the public key. If the hash value is not matched, the first gateway 124 decrypts the encrypted symmetric session key with the previous private key. The first gateway 124 then decrypts the encrypted messages using the decrypted symmetric session key and transmits the decrypted messages to the corresponding enterprise server 111.

In one embodiment, the first gateway 124 is hosted at the enterprise network 110 includes one or more application packages installed at the enterprise network 110.

Figure 3:
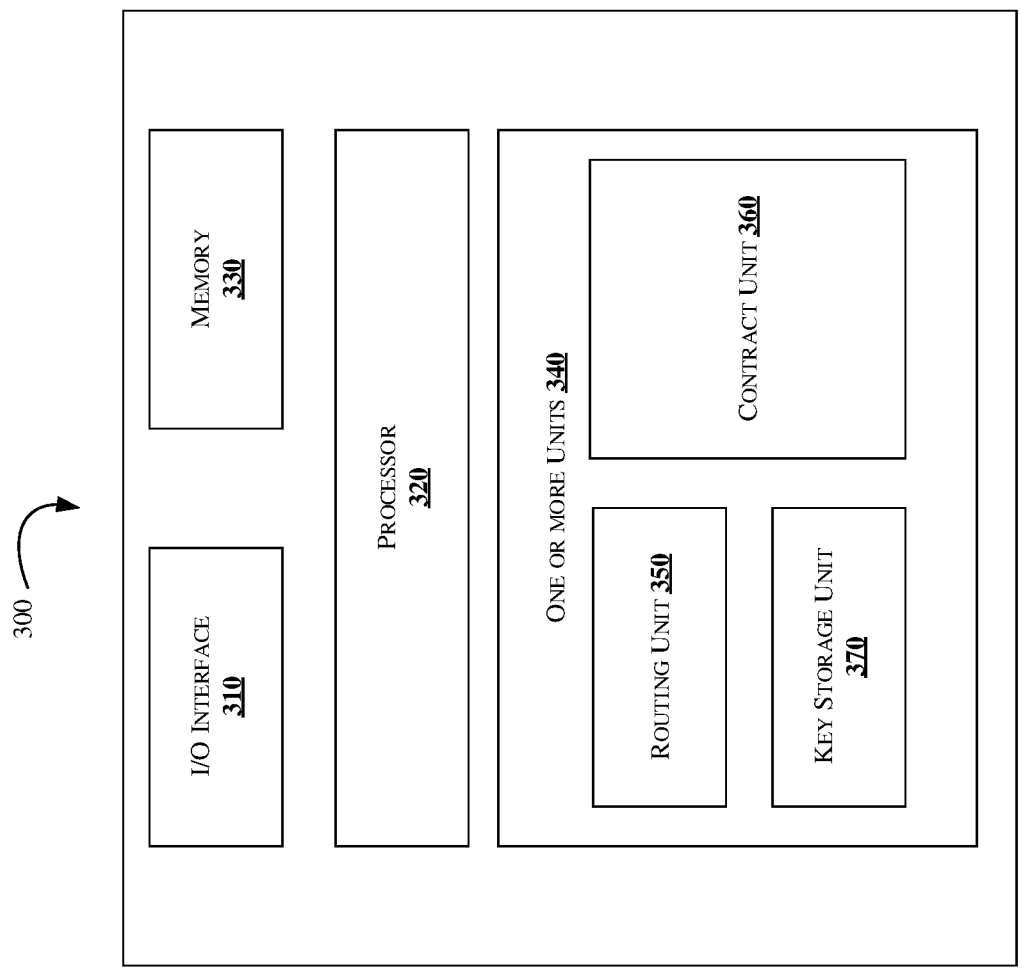
FIG. 3 illustrates a detailed block diagram of a communication server in accordance with some embodiments of the present disclosure.

FIG. 3 illustrates a detailed block diagram of the communication server in accordance with some embodiments of the present disclosure.

In an implementation, the communication server 300 may include an I/O interface 310, a processor 320, a memory 330, and one or more units 340. The I/O interface 310 includes a plurality of interfaces that comprises at least a first interface and at least a second interface. In one embodiment, the at least first interface is configured to receive encrypted message from one or more enterprise servers 111 through the first gateway 124 and the at least second interface is configured to push the encrypted message to one or more telecom servers 131 through the second gateway 126. The processor 320 may be configured to perform one or more functions of the communication server 120 for secured transmission and routing of messages. The memory 330 may be communicatively coupled to the processor 320 and may store one or more data related to the communication server 120.

In one implementation, the units 340 may be stored as a part of the processor 320. In another implementations, the units 340 may be communicatively coupled to the processor 320 for performing one or more functions of the communication server 120. The units may include, without limiting to, routing unit, contract unit, and a key storage unit.

As used herein, the term unit refers to an application specific integrated circuit (ASIC), an electronic circuit, a processor (shared, dedicate, or group) and memory that execute one or more software or firmware programs, a combination logic circuit, and/or other suitable components that provide the described functionalities of the communication server.

In an embodiment, the routing unit 350 may be used to route the encrypted message received from one of first gateway 124 and a second gateway 126 to appropriate recipient based on routing logic and metadata received along with the encrypted messages. In one embodiment, the routing unit 350 is configured to route encrypted messages received from one or more enterprises servers 111 through the first gateway 124 to appropriate telecom server 131 through the second gateway 126 based on the routing logic and metadata received along with the encrypted messages. In another embodiment, the routing unit 350 is configured to route encrypted messages received from one or more user devices 140 through the third gateway 135 to appropriate enterprise server 111 through the first gateway 124 based on the routing logic and metadata received along with the encrypted messages. In one embodiment, each of the encrypted message is transmitted along the metadata information including a source identification number, an end user identification number, header of the messages, and information about decryption either at a second gateway or at the third gateway, as provided the routing unit. In one embodiment, the routing unit 350 is capable of pushing the encrypted messages to the one or more telecom servers without accessing message content of the encrypted messages. In one exemplary embodiment, the routing unit 350 comprises a memory, a processor, and at least one interface coupled to the first, the second, and the third gateway.

In an embodiment, the contract unit 360 of the communication server 120 is coupled to one or more aggregators to evaluate one or more contract with one or more enterprise servers 111 and one or more telecom servers 131 and route messages received from one or more user devices 140 to one or more enterprise servers 131 and vice versa by the communication server 120 accordingly.

In an embodiment, the key storage unit 370 of the communication server 120 is configured to store public key of enterprise servers 111 along with mapping of the public keys with corresponding enterprise server 111. In another embodiment, the key storage unit 370 also stores public key of telecom servers 131 along with mapping of the public keys with corresponding telecom server 131. In another embodiment, the key storage unit 370 also stores public key of user devices 140 along with mapping of the public keys with corresponding user devices 140.

In operation, the communication server 120 receives encrypted message content from at least one of enterprise servers 111 and user device 140 and push the encrypted messages to at least one of user device 140 and enterprise servers 111 by a predefined logic in routing unit based on the metadata of the messages only, without access to the message content. In one embodiment, metadata associated with the encrypted message includes a source identification number, an end user identification number, header of the messages, and information about decryption either at the second gateway or at the third gateway, as provided by the routing unit. Further, the communication server 120 is configured to store at least one of public key generated by at least one of the enterprise servers, the telecom severs 131, and user devices 140. In an embodiment, the communication server 120 is configured to generate an alert to one or more enterprise servers 111, one or more telecom servers 131, and one or more user devices 140 to dynamically change/rotate a pair of keys and upload new public keys in the key storage unit 370 of the communication server 120. In another embodiment, the communication server 120 receives an alert from the at least one of one or more enterprise servers 111, one or more telecom servers 131, and one or more user devices 140 when the corresponding gateway is uninstalled or removed. In another embodiment, in response to the alert, the communication server 120 removes at least one public key associated with corresponding gateway from the key storage unit 370.

Figure 4:
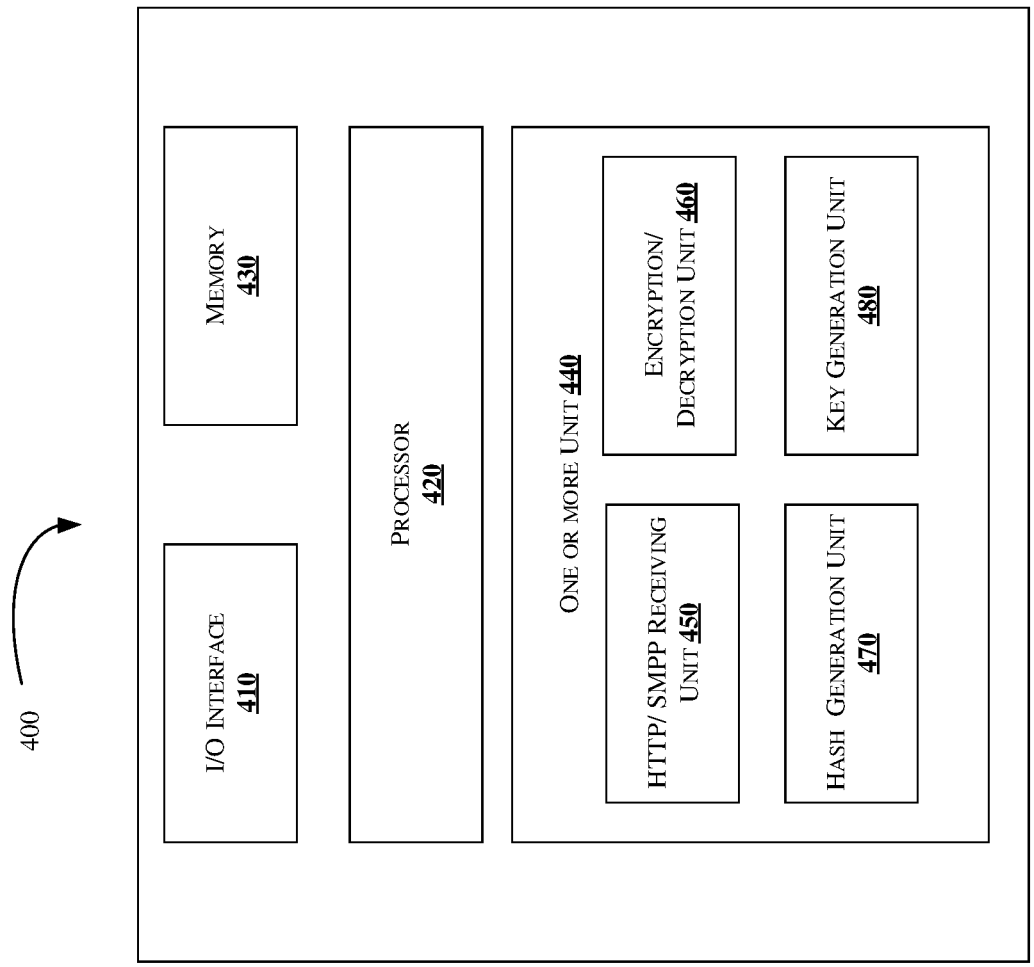
FIG. 4 illustrates a detailed block diagram of an exemplary second gateway and/or third gateway in accordance with some embodiments of the present disclosure.

FIG. 4 illustrates a detailed block diagram of a gateway 400 deployed at telecom server and/or user device, corresponding to second gateway 126 and/or third gateway 135 in accordance with some embodiments of the present disclosure. In an implementation, the second gateway 126 and/or the third gateway 135 may include an I/O interface 410, a processor 420, a memory 430, and one or more units 440. The I/O interface 410 may be configured to receive messages from the corresponding telecom servers 111 which are received from at least one end user 140. Further, the I/O interface 410 may be configured to transmit encrypted messages to the communication server 120. The processor 420 may be configured to perform one or more functions of the second gateway 126 and/or the third gateway 135 for performing encrypting and decrypting operations. The memory 430 may be communicatively coupled to the processor 420 and may store one or more data related to the second gateway 126 and/or the third gateway 135.

In some implementations, the second gateway 126 and/or the third gateway 135 may include units 440 for performing various operations in accordance with embodiments of the present disclosure. In an embodiment, the data may be stored within the memory 430 and may include, without limiting to, at least one of public key of each enterprise server 111 and a pair of keys of corresponding telecom server 111 and/or corresponding user devices 140 in a cache memory. In one embodiment, at least one of public key of each enterprise server 111 is stored in a cache memory. In one embodiment, the second gateway 126 and/or the third gateway 135 decrypts the encrypted messages for delivering to the one or more user devices based on the metadata information.

In one embodiment, at least one public key of each enterprise server 111 is retrieved from the communication server 120 and stored in the cache memory for a certain time period.

In one embodiment, a pair of keys of corresponding telecom servers 131 is retrieved includes a pair of public and private key. In one embodiment, a pair of keys of corresponding user device 140 is retrieved includes a pair of public and private key. During the dynamic change/rotation of the pair of keys generated at the telecom server 131 and/or the user device 140, each of the first gateway 124 updates the corresponding public key of the telecom server 131 and user device 140 only after a cache is expired. Thus, the second gateway 126 and/or the third gateway 135 maintains the present and previous key pairs so that the second gateway 126 and/or the third gateway 135 can decrypt messages encrypted from one of the first gateway 124 using previous public key.

In one implementation, the units 440 may be stored as a part of the processor 420. In another implementations, the units 440 may be communicatively coupled to the processor 420 for performing one or more functions of the second gateway 126 and/or the third gateway 135. The units 440 may include, without limiting to, SMPP receiving unit 450, encryption/decryption unit 460, hash generation unit 470, and key generation unit 480.

In one embodiment, the processor 420 of second gateway 126 is configured to verify/inspect/detect whether a third gateway 135 is deployed at the user devices 140, if yes, then the telecom server 131 will simply push the message to the user device 140 without decrypting the message content at the telecom server 131. During this condition, the processor 420 of third gateway 135 will decrypt the message at the user device 140. On the contrary, if the third gateway 135 is not available at the user device 140, then processor 420 of second gateway 126 is configured to decrypt the message at the telecom server 131 using encryption/decryption unit 460.

As used herein, the term unit refers to an application specific integrated circuit (ASIC), an electronic circuit, a processor (shared, dedicate, or group) and memory that execute one or more software or firmware programs, a combination logic circuit, and/or other suitable components that provide the described functionalities of the first gateway.

In an embodiment, the SMPP receiving unit 450 may be used to receive the messages transmitted from corresponding telecom server 131 and/or user device 140 using SMPP protocol.

In an embodiment, the encryption/decryption unit 460 may be used to perform one of encryption and decryption operations.

During encryption operation, the encryption/decryption unit 460 of the second gateway 126 and/or the third gateway 135 is configured to encrypt the messages received from the telecom server 131 and/or user devices 140 using a random symmetric session key generated. The encryption/decryption unit 460 is further configured to encrypt the symmetric session key using at least one public key of the one or more enterprise servers 111 received from the communication server 120 and/or from a cache memory 430.

During decryption operation, the encryption/decryption unit 460 is configured to decrypt encrypted symmetric session key of at least a first gateway 124 received from the communication server 120 using at least one private key of corresponding telecom server 131 and/or the corresponding user device 140 and to decrypt one or more encrypted messages received from the one or more enterprise server 111 using the decrypted symmetric session key.

In an embodiment, the hash generation unit 470 is configured to generate hash value for the messages transmitted from the corresponding telecom server 131 and/or user devices 140 and also to generate hash value for public key of each enterprise server 111.

In an embodiment, the key generation unit 480 is configured to generate a random symmetric session key for encrypting messages received from corresponding telecom server 111 and/or user device 140. In one embodiment, the key generation unit 480 is also configured to generate a pair of public and private keys for corresponding telecom server 131 and/or user device 140.

In operation, in case of P2A message scenario, the messages transmitted from the end user 140 via the telecom network 130 to the enterprise network 110, the telecom server 131 receives one or more messages from end users 140 and initiates a request for P2A message transmission to the communication server 120. On successful acknowledgement by the communication server 120 to allow the request to send P2A messages, the messages are received by the second gateway 126. The second gateway 126 generates a message packet from the received messages, wherein the message packet comprises metadata, and encrypted message content that is encrypted using the symmetric session key and a message hash. The second gateway 126 then encrypts the symmetric session key using at least one public key provided by the one or more enterprise servers 111. In one embodiment, at least one public key provided by the one or more enterprise servers 111 is retrieved from the communication server 120. In one embodiment, at least one public key provided by the one or more enterprise servers 111 is retrieved from the cache memory 230. The second gateway 126 and/or the third gateway 135 encrypts the symmetric session key with each public key of the enterprise server 111 and then generates hash values of each public key of enterprise servers 111. The second gateway 124 and/or the third gateway 135 then transmits the encrypted message to the communication server 120 which consists of metadata which is unencrypted, encrypted message content & message Hash, and a plurality of encrypted symmetric key and hash values of the at least one public key provided by the one or more enterprise servers 111.

In operation, in case of A2P message scenario, the messages transmitted from the enterprise network 110 to the user device 140. The second gateway 126 and/or third gateway 135 receives unencrypted metadata, encrypted message content and message hash, and a plurality of encrypted symmetric session keys which encrypted with one of each of the telecom server's public key and each of the user device's public key and hash values of at least one public key of one or more telecom servers 131 and/or user devices 140. The second gateway 126 and/or the third gateway 135 retrieves public key of the corresponding telecom server 131 and/or user device 140 and compares hash value of the public key with the plurality of hash values received. If the hash value match, then the second gateway 126 decrypts the encrypted symmetric session key with private key corresponding to the public key. If the hash value is not matched, the second gateway 126 compares hash value of a previous public key with the plurality of hash values received. If the hash value is not matched, then the message is sent encrypted to the one or more user device 140 via the third gateway 135. If the hash value matches, the second gateway 126 then decrypts the encrypted messages using the decrypted symmetric session key and transmits the decrypted messages to the corresponding telecom server 131. In one embodiment, the second gateway 126 and the third gateway 135 are hosted at the telecom network 130 and the user devices 140, respectively include one or more application packages installed at the telecom network 130 and the user devices 140.

Figure 5:
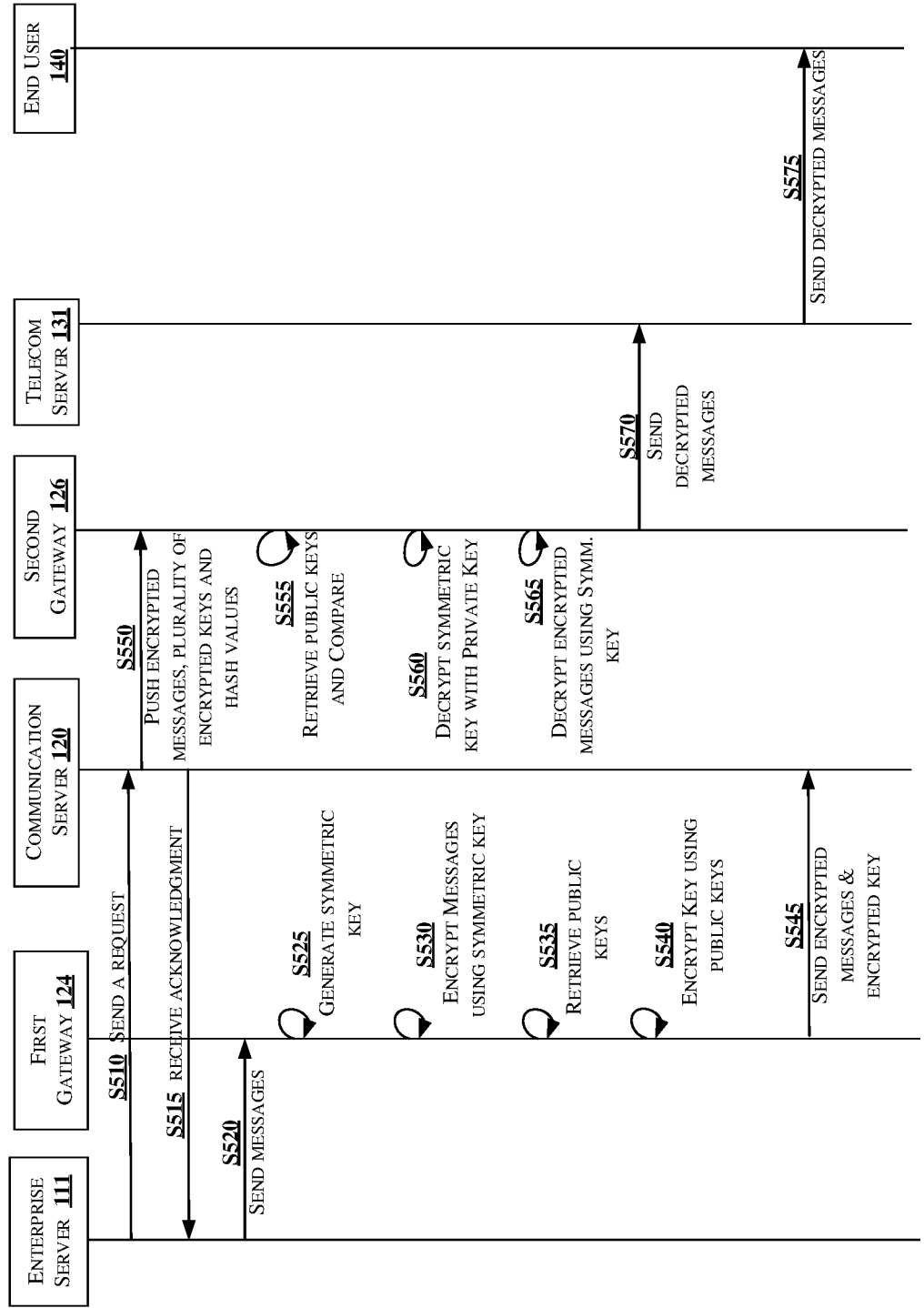
FIG. 5 is a communication flow diagram of a method transmission of A2P message transmission in which messages are encrypted at enterprise network and decrypted at telecom network.

FIG. 5 is a communication flow diagram of a method transmission of A2P message transmission in which messages are encrypted at a first gateway and decrypted at a second gateway.

As illustrated in FIG. 5, the method 500 comprises one or more steps implemented by a first gateway 124 and a second gateway 126. The method 500 may be described in the general context of computer executable instructions. Generally, computer executable instructions can include routine, programs, objects, components, data structures, procedures, units, and functions, which perform particular functions or implement particular abstract data types.

At step S510, a request for transmission of messages is sent from at least one of one or more enterprise servers 111 to a communication server 120. In one embodiment, the messages are application-to-person (A2P) messages that are intended to be transmitted to the at least one user device 140. In one embodiment, the messages include at least one of SMS, RCS, push notifications, and email.

At step S515, a successful acknowledgement is sent by the communication server 120 to the requested enterprise server 111 for allowing the request to send messages.

At step S520, the messages are transmitted from the enterprise server 111 to the first gateway 124. In one embodiment, the messages are transmitted using one of HTTP or SMPP protocol.

At step S525, a random symmetric session key is generated by the first gateway 124 to encrypt the messages received. In one embodiment, the random symmetric key can be of length 256 bits. In another embodiment, the random symmetric key can be of length 512 bits.

At step S530, the messages are encrypted using the symmetric session key generated at the first gateway 124.

At step S535, a public key of each of telecom servers 131 is retrieved from a key storage unit of the communication server 120 and/or the cache memory 230 associated with the first gateway 124 to encrypt the symmetric session key with each telecom servers 131. In one embodiment, the symmetric key is encrypted using at least one public key provided by the one or more telecom servers 131, when the at least one public key provided by the one or more user devices 140 is not available in the key storage unit of the communication server 120.

At step S540, the symmetric session key is encrypted using the public key of the one or more telecom server 131.

At step S545, the encrypted messages and a plurality of encrypted symmetric session keys are transmitted to the communication server 120 along with hash values of public keys of the one or more telecom servers 131.

At step S550, the encrypted messages, and a plurality of encrypted symmetric session keys, and hash values of public keys of one of the one or more telecom servers 131 are pushed from the communication server 120 to the second gateway 126.

At step S555, the present and previous public keys of telecom server 111 corresponding to the second gateway 126 are retrieved from a cache memory 230 and/or from the communication server 120 and are compared with the plurality of hash values provided by the first gateway 124.

At step S560, the encrypted symmetric session key is decrypted by the second gateway using a private key received from the telecom server 131. In one embodiment, the second gateway 126 retrieves a public key of the corresponding enterprise server 111 and compares hash value of the public key with the plurality of hash values. If the hash value match, then the second gateway 126 decrypts the encrypted symmetric session key with private key corresponding to the public key. If the hash value is not matched, then the second gateway 126 decrypts the encrypted symmetric session key with a previous private key.

At step S565, the encrypted messages received is decrypted by the second gateway 126 using the decrypted symmetric session key.

At step S570, the decrypted messages are sent to the telecom server 131.

At step S575, the decrypted messages are sent from the telecom server 131 to the user device 140.

Figure 6:
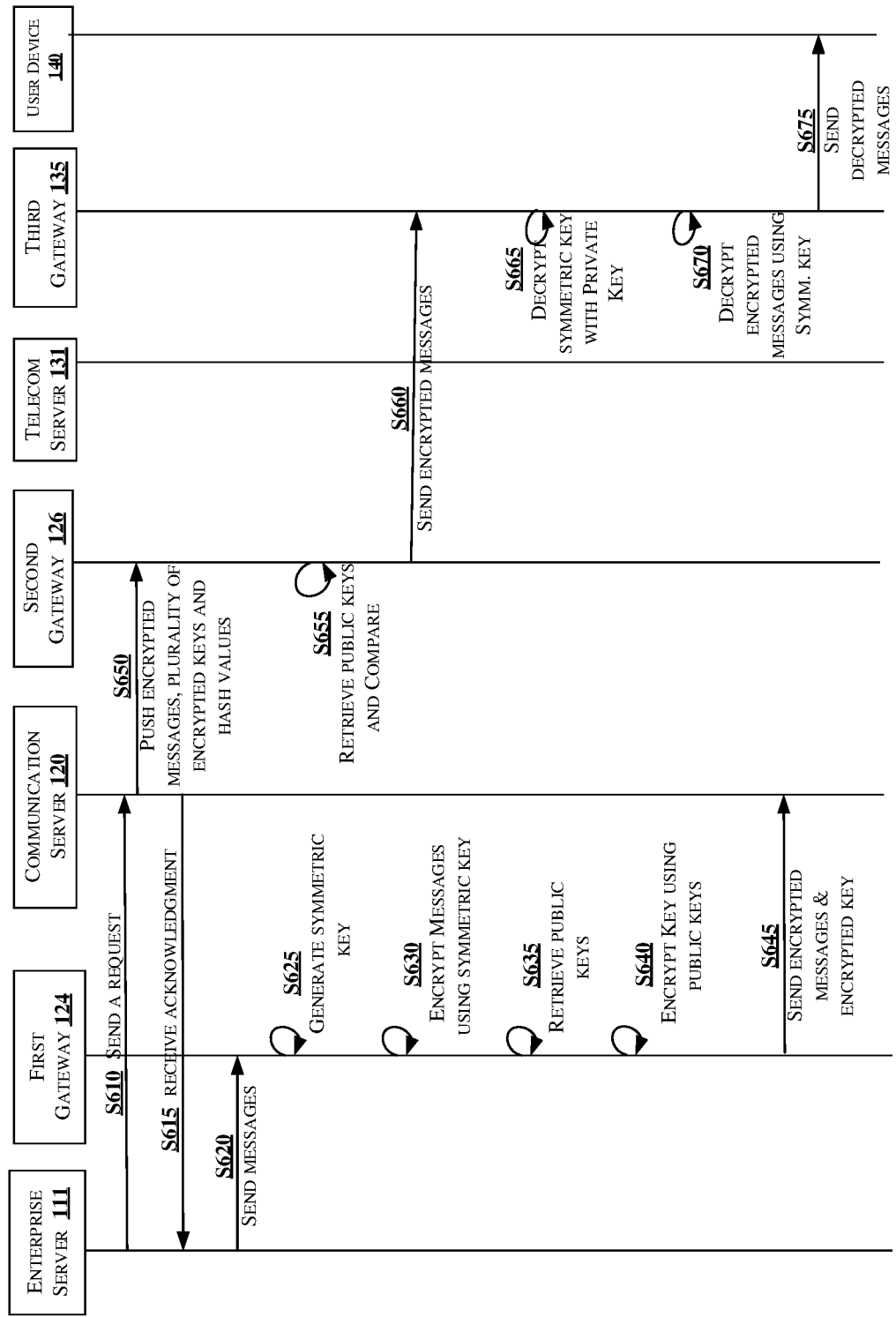
FIG. 6 is a communication flow diagram of a method transmission of A2P message transmission in which messages are encrypted at enterprise network and decrypted at user devices.

FIG. 6 is a communication flow diagram of a method transmission of A2P message transmission in which messages are encrypted at a first gateway 124 and decrypted at a third gateway 135.

As illustrated in FIG. 6, the method 600 comprises one or more steps implemented by a first gateway 124 and a third gateway 135. The method 600 may be described in the general context of computer executable instructions. Generally, computer executable instructions can include routine, programs, objects, components, data structures, procedures, units, and functions, which perform particular functions or implement particular abstract data types.

At step S610, a request for transmission of messages is sent from at least one of one or more enterprise servers 111 to a communication server 120. In one embodiment, the messages are application-to-person (A2P) messages that are intended to be transmitted to the at least one user device 140. In one embodiment, the messages include at least one of SMS, RCS, push notifications, and email.

At step S615, a successful acknowledgement is sent by the communication server 120 to the requested enterprise server 111 for allowing the request to send messages.

At step S620, the messages are transmitted from the enterprise server 111 to the first gateway 124. In one embodiment, the messages are transmitted using one of HTTP or SMPP protocol.

At step S625, a random symmetric session key is generated by the first gateway 124 to encrypt the messages received. In one embodiment, the random symmetric key can be of length 256 bits. In another embodiment, the random symmetric key can be of length 512 bits.

At step S630, the messages are encrypted using the symmetric session key generated at the first gateway 124.

At step S635, a public key of each of telecom servers 131 is retrieved from a key storage unit of the communication server 120 and/or the cache memory 230 associated with the first gateway 124 to encrypt the symmetric session key with each user devices 140. In one embodiment, the symmetric key is encrypted using at least one public key provided by the one or more user devices 140, when the at least one public key provided by the one or more user devices 140 is available in the key storage unit of the communication server 120.

At step S640, the symmetric session key is encrypted using the public key of the one or more user devices 140.

At step S645, the encrypted messages and a plurality of encrypted symmetric session keys are transmitted to the communication server 120 along with hash values of public keys of the one or more user devices 140.

At step S650, the encrypted messages, and a plurality of encrypted symmetric session keys, and hash values of public keys of one of the one or more user devices 131 are pushed from the communication server 120 to the second gateway 126.

At step S655, the present and previous public keys of telecom server 111 corresponding to the second gateway 126 are retrieved from a cache memory 230 and/or from the communication server 120 and are compared with the plurality of hash values provided by the first gateway 124. In one embodiment, the second gateway 126 retrieves public key of the corresponding telecom server 131 and/or user device 140 and compares hash value of the public key with the plurality of hash values received. If the hash value match, then the second gateway 126 decrypts the encrypted symmetric session key with private key corresponding to the public key. If the hash value is not matched, the second gateway 126 compares hash value of a previous public key with the plurality of hash values received. If the hash value is not matched, then the message is sent encrypted to the one or more user device 140 via the third gateway 135.

At step S660, the encrypted messages are sent from the telecom server through the second gateway to the third gateway 135.

At step S665, the encrypted symmetric session key is decrypted by the third gateway 135 using a private key received from the user device 140. In one embodiment, the third gateway 135 retrieves a public key of the corresponding enterprise server 111 and compares hash value of the public key with the plurality of hash values. If the hash value match, then the third gateway 135 decrypts the encrypted symmetric session key with private key corresponding to the public key. If the hash value is not matched, then the third gateway 135 decrypts the encrypted symmetric session key with a previous private key.

At step S670, the encrypted messages received is decrypted by the third gateway 135 using the decrypted symmetric session key.

At step S675, the decrypted messages are sent to the user device 140 from the third gateway 135.

Figure 7:
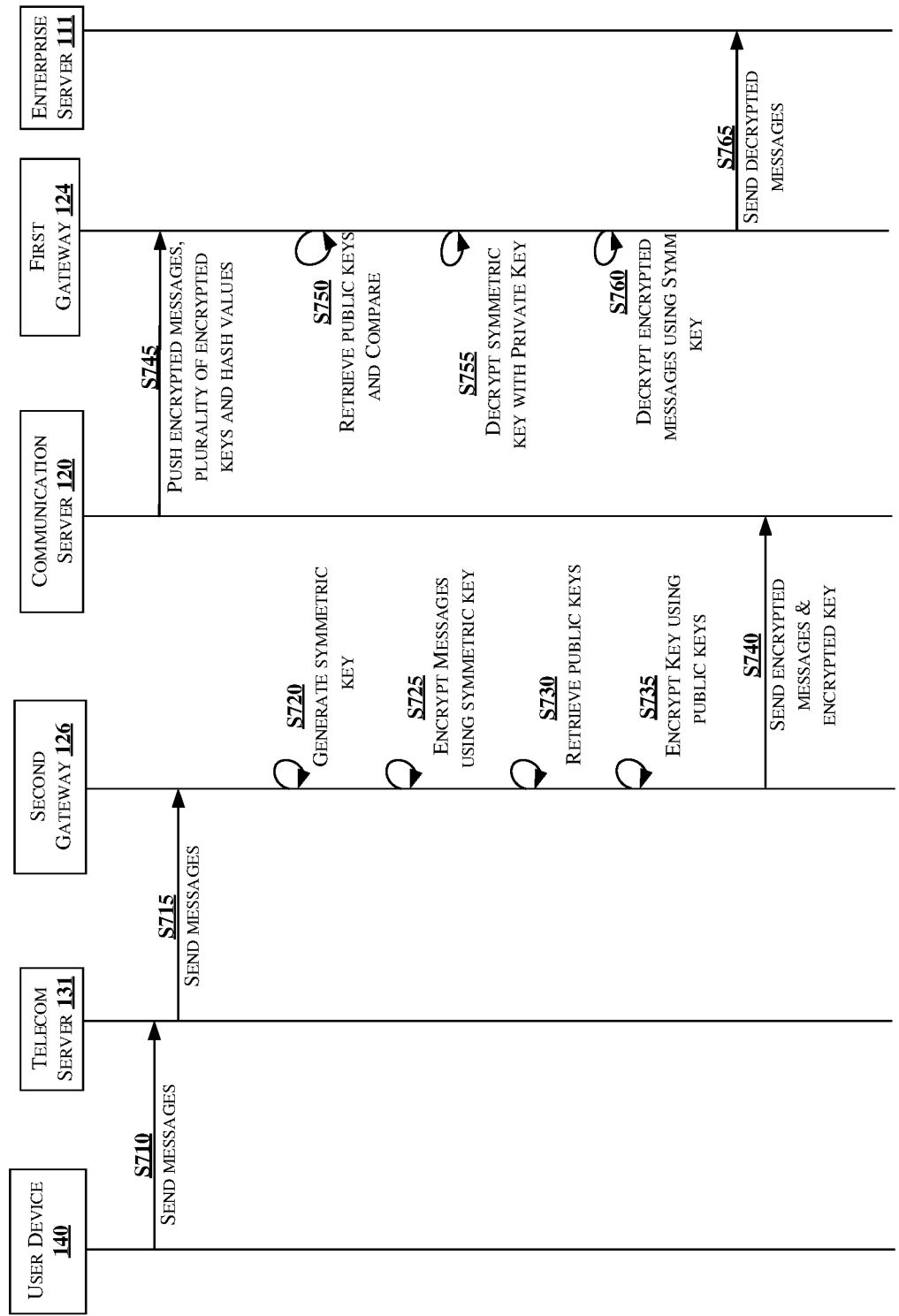
FIG. 7 is a communication flow diagram of a method transmission of P2A message transmission in which messages are encrypted at telecom network and decrypted at enterprise network.

FIG. 7 is a communication flow diagram of a method transmission of P2A message transmission in which messages are encrypted at a second gateway 126 of telecom server 131 and decrypted at a first gateway 124 of the enterprise server 111.

As illustrated in FIG. 7, the method 700 comprise one or more steps implemented by a first gateway 124 and a second gateway 126. The method 700 may be described in the general context of computer executable instructions. Generally, computer executable instructions can include routine, programs, objects, components, data structures, procedures, units, and functions, which perform particular functions or implement particular abstract data types.

At step S710, the messages are transmitted from the user device 140 to the telecom server 131.

At step S715, the messages are transmitted from the telecom server 131 to the second gateway 124. In one embodiment, the messages are transmitted without encrypting when there is no gateway or APP present at the user device 140.

At step S720, a random symmetric session key is generated by the second gateway 126 to encrypt the messages received. In one embodiment, the random symmetric key can be of length 256 bits. In another embodiment, the random symmetric key can be of length 512 bits.

At step S725, the messages are encrypted using the symmetric session key generated at the second gateway 126.

At step S730, a public key of each enterprise server 111 is retrieved from a key storage unit of the communication server 120 and/or the cache memory 230 associated with the second gateway 126 to encrypt the symmetric session key with each enterprise servers 111.

At step S735, the symmetric session key is encrypted using the public key of one of one or more enterprise server 111.

At step S740, the encrypted messages and a plurality of encrypted symmetric session keys are transmitted to the communication server 120 along with hash values of public keys of the one or more enterprise servers 111.

At step S745, the encrypted messages, and a plurality of encrypted symmetric session keys, and hash values of public keys of the one or more enterprise servers 111 are pushed from the communication server 120 to the first gateway 124.

At step S750, the present and previous public keys of enterprise server 111 corresponding to the first gateway 124 are retrieved from enterprise server 111 and are compared with the plurality of hash values provided by the second gateway 126.

At step S755, the encrypted symmetric session key is decrypted by the first gateway 124 using a private key received from the enterprise server 111. In one embodiment, the first gateway 124 retrieves a public key of the corresponding enterprise server 111 and compares hash value of the public key with the plurality of hash values. If the hash value match, then the first gateway 124 decrypts the encrypted symmetric session key with private key corresponding to the public key. If the hash value is not matched, then the first gateway 124 decrypts the encrypted symmetric session key with a previous private key.

At step S760, the encrypted messages received is decrypted by the first gateway 124 using the decrypted symmetric session key.

At step S765, the decrypted messages are sent to the enterprise server 111.

Figure 8:
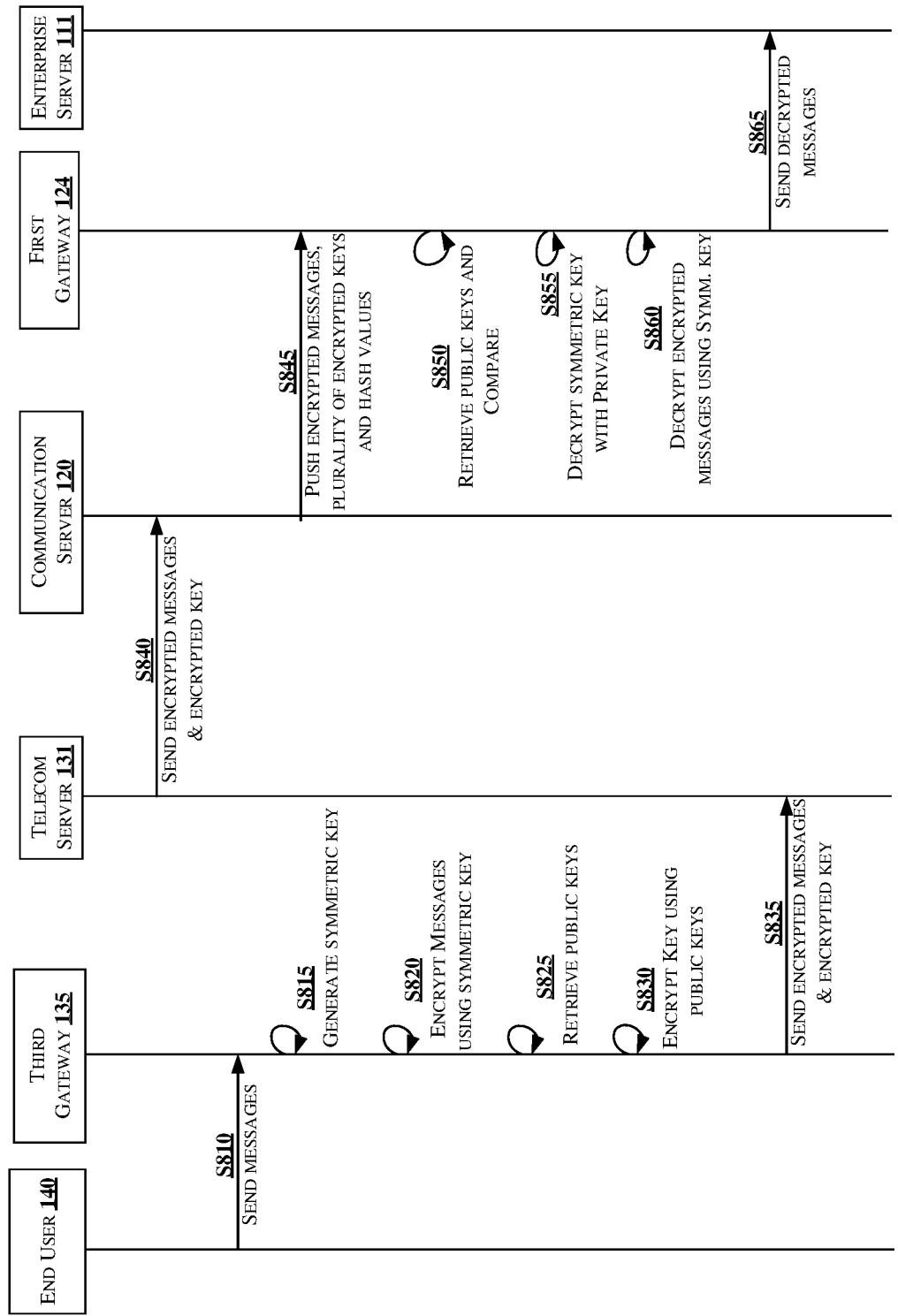
FIG. 8 is a communication flow diagram of a method transmission of P2A message transmission in which messages are encrypted at user devices and decrypted at enterprise network.

FIG. 8 is a communication flow diagram of a method transmission of P2A message transmission in which messages are encrypted at user device 140 using a third gateway 135 and decrypted at a first gateway 124 of the enterprise server 111.

As illustrated in FIG. 8, the method 800 comprise one or more steps implemented by a first gateway 124, a second gateway 126, and a third gateway 135. The method 800 may be described in the general context of computer executable instructions. Generally, computer executable instructions can include routine, programs, objects, components, data structures, procedures, units, and functions, which perform particular functions or implement particular abstract data types.

At step S810, the messages are transmitted from the user device 140 to the third gateway 135.

At step S815, a random symmetric session key is generated by the third gateway 135 to encrypt the messages received. In one embodiment, the random symmetric key can be of length 256 bits. In another embodiment, the random symmetric key can be of length 512 bits.

At step S820, the messages are encrypted using the symmetric session key generated at the third gateway 135.

At step S825, a public key of each enterprise server 111 is retrieved from a key storage unit of the communication server 120 and/or the cache memory 230 associated with the third gateway 135 to encrypt the symmetric session key with each enterprise servers 111.

At step S830, the symmetric session key is encrypted using the public key of one of one or more enterprise server 111.

At step S835, the encrypted messages and a plurality of encrypted symmetric session keys are transmitted to the telecom server 131 along with hash values of public keys of one of the one or more enterprise servers 111.

At step S840, the encrypted messages and a plurality of encrypted symmetric session keys are transmitted to the communication server 120 along with hash values for public keys of one of the one or more enterprise servers 111.

At step S845, the encrypted messages, and a plurality of encrypted symmetric session keys, and hash values for public keys of one of the one or more enterprise servers 111 are pushed from the communication server 120 to the first gateway 124.

At step S850, the present and previous public keys of enterprise server 111 corresponding to the first gateway 124 are retrieved from enterprise server 111 and are compared with the plurality of hash values provided by the third gateway 135.

At step S855, the encrypted symmetric session key is decrypted by the first gateway 124 using a private key received from the enterprise server 131. In one embodiment, the first gateway 124 retrieves a public key of the corresponding enterprise server 111 and compares hash value of the public key with the plurality of hash values. If the hash value match, then the first gateway 124 decrypts the encrypted symmetric session key with private key corresponding to the public key. If the hash value is not matched, then the first gateway 124 decrypts the encrypted symmetric session key with a previous private key.

At step S860, the encrypted messages received is decrypted by the first gateway 124 using the decrypted symmetric session key.

At step S865, the decrypted messages are sent to the enterprise server 111.

Figure 9:
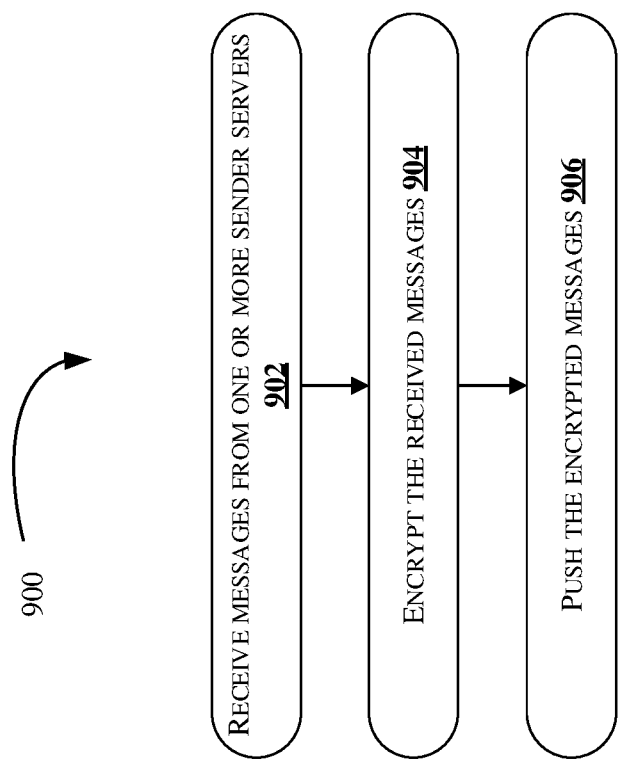
FIG. 9 is an exemplary flowchart showing a method for secured transmission of messages by a communication server in accordance with an embodiment of the present disclosure.

FIG. 9 is an exemplary flowchart showing a method for secured transmission of messages by a communication server in accordance with an embodiment of the present disclosure.

As illustrated in FIG. 9, the method 900 comprises one or more blocks implemented by the communication server 120. The method 900 may be described in the general context of computer executable instructions. Generally, computer executable instructions can include routines, programs, objects, components, data structures, procedures, units, and functions, which perform particular functions or implement particular abstract data types.

The order in which the method 900 is described is not intended to be construed as a limitation, and any number of the described method blocks can be combined in any order to implement the method 800. Additionally, individual blocks may be deleted from the method 800 without departing from the spirit and scope of the subject matter described herein. Furthermore, the method 900 can be implemented in any suitable hardware, software, firmware, or combination thereof.

At block 902, messages are received from one or more enterprise servers. The messages are received by a communication server 120 for delivering the messages to one or more end users. In one embodiment, the messages can be Application-to-Person (A2P) message that are intended to end user delivery. In one embodiment, the messages are received from one or more enterprise servers includes receiving a request for sending messages by the communication server 120 from the one or more enterprise servers and sending a successful acknowledgement by the communication server to allow a request for sending messages. In one embodiment, each enterprise server 111 of the enterprise network 110 includes corresponding gateway that is hosted by the communication server 120 for secured routing of one of A2P and P2A message and for secure transmission of the messages. The corresponding gateway is deployed either on-premise or on-cloud through the communication server 120. In one embodiment, message transmitted by one or more enterprise servers 111 is received by the corresponding gateway 124.

At block 904, the received messages are encrypted by the first gateway 124. In one embodiment, the first gateway 124 hosted at the corresponding enterprise server 111 is configured to encrypt the messages received. In an exemplary embodiment, during the deployment of at least a first gateway 124 at the corresponding enterprise server 111, at least a second gateway 126 at the corresponding telecom server 131, and at least a third gateway 135 at the corresponding user device 140, a pair of public and private key is generated by each of the enterprise server 111, telecom server 131, and user device 140 using at least one of internal certificate authority (or) any third party certificate authority. Each of the generated public key is uploaded at the key storage unit of the communication server 120 along with mapping of the public key corresponding to the enterprise server 111, the telecom server 131, and user device 140. The generated key pair are dynamically changed after a predetermined time duration such that message transmission throughput is not affected. When the message M is transmitted from one or more enterprise servers. The encryption of the message M by the first gateway 124 includes creating a random symmetric session E_M. The message M is encrypted with E_M as symmEnc (E_M, M). The first gateway then looks public key of each telecom operator (i) from the key storage unit of the communication server 120 or from the local cache memory and retrieves a public key of each telecom server and/or user device (Pbi). The random symmetric session (E_M) is then encrypted with the public key of each telecom server (Pbi) as AsymmEnc (Pbi, E_M). The first gateway 124 is then configured to compute hash for the public key of each telecom server as Hash (Pbi). The encrypted messages, that includes symmEnc (E_M, M), AsymmEnc (Pbi, E_M), Hash (Pbi), and metadata, are then received by a first interface of the communication server 120 through the first gateway 124.

At block 906, the encrypted messages are pushed to one or more telecom servers. In one embodiment, the communication server is configured to push the encrypted messages to corresponding telecom servers based on the metadata included in the encrypted messages using a routing logic without accessing the message content. Once, the encrypted messages are received by one or more second gateway, the second gateway 126 retrieves public key of the corresponding telecom server 131 and computes Hash (Pb). In one embodiment, when the telecom server 131 is in midst of key rotation and there are multiples public keys, then the second gateway 131 computes Hash for each of the public key and compares the computed Hash. Based on the comparison, the second gateway 131 retrieve appropriate private key for decrypting the encrypted symmetric session key. The second gateway 131 then decrypts the encrypted message using the decrypted symmetric session key. In one embodiment, the messages is transmitted by one or more enterprise servers is digitally signed by a private key before transmitting to the first gateway and during the decryption, the second gateway 131 fetches public key of the enterprise server from the key storage unit of the communication server 102 and verifies authenticity of the one or more enterprise servers.

Figure 10:
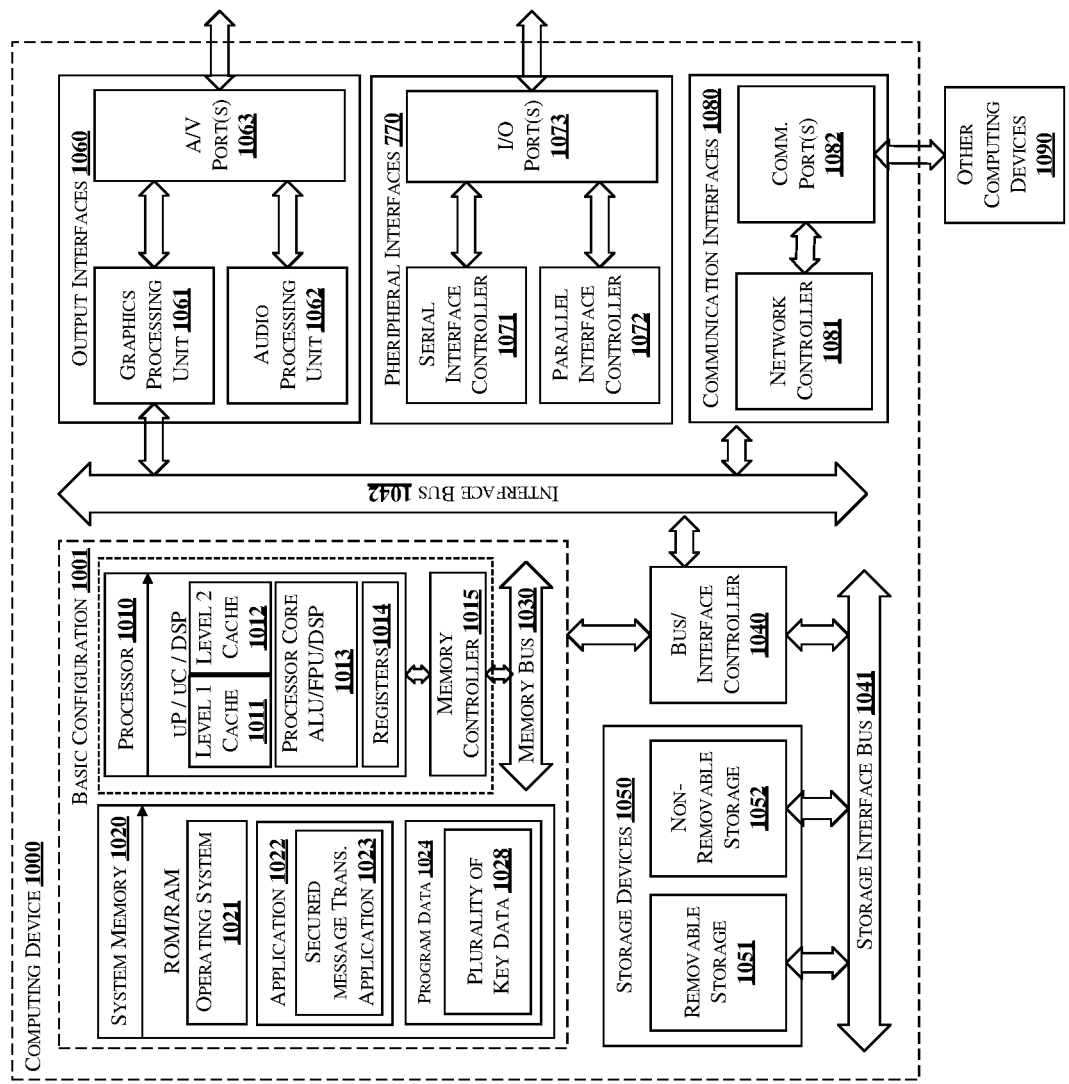
FIG. 10 shows a block diagram illustrating an example computing device by which various example solutions described herein may be implemented, arranged in accordance with at least some embodiments of the present disclosure.

FIG. 10 shows a block diagram illustrating an example computing device by which various example solutions described herein may be implemented, arranged in accordance with at least some embodiments described herein. In a very basic configuration 1002, computing device 1000 typically includes one or more processors 1004 and a system memory 1006. A memory bus 1008 may be used for communicating between processor 1004 and system memory 1006. Depending on the desired configuration, processor 1004 may be of any type including but not limited to a microprocessor (μP), a microcontroller (μC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004. Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include one or more algorithms 1026 for secure transmission of messages that may be arranged to perform the functions as described herein including those described with respect to processing flow 900 of FIG. 9. Program data 1024 may include a plurality of keys 1028 that may be useful for operation with the various algorithms 1026 as described herein.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, nonremovable storage devices 1038, or a combination thereof. Examples of removable storage and nonremovable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program units, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program units, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fibre optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedeol components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically makeable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Advantages of the Embodiment of the Present Disclosure are Illustrated Herein.

In an embodiment, the present disclosure provides a system and method for secured connectivity between enterprise and telecom operator network and/or user device, thereby maintaining secrecy of end users sensitive/personal identifiable information enabling data security and data privacy.

In an embodiment, the present disclosure secured connectivity even in case of compromising of communication server, As the private keys are not known to the communication server and known only to the enterprise server and the telecom server and/or user devices. Moreover, the transmitted messages are further secure since the keys are dynamically changed, thereby re-establishing a new public/private key pair for the particular recipient to whom the message is intended post a pre-defined interval, thus resulting into two-fold advantage of achieving forward and future secrecy of the messages, wherein the message throughput is not affected by key rotation/change.

Further, user profiling is eliminated, wherein the third parties are unable to make profiles of the end users, since the clear message content is not known, resulting in elimination of user profiling based on end user's private and confidential information. Moreover, the problem of fraud calls/SMS message is eliminated as there is no availability of clear message content with the third parties for e.g. there is a message related to declining of a credit card of an end user during a payment attempt at any point of sale device. However, in the proposed solution, clear content of this message is not visible to the third parties, therefore preventing fraud call/SMS message comprising fraud payment link for completing the incomplete payment.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A communication server for secured transmission of messages from one or more enterprise servers to one or more user devices, comprising:
    a first gateway hosted at the one or more enterprise servers for encrypting the messages, wherein the first gateway is configured to:
        encrypt each message using at least one symmetric key, wherein the at least one symmetric key is generated randomly by the first gateway; and
        encrypt the at least one symmetric key using at least one public key of at least one of one or more telecom servers and the one or more user devices;
    a routing unit for routing the encrypted messages along with metadata information, from the one or more enterprise servers, to the one or more user devices via one or more telecom servers; and
    a second gateway hosted at the one or more telecom servers for retrieving the encrypted messages from the routing unit, wherein to decrypt the encrypted messages based on the metadata information, the second gateway is configured to:
        decrypt the at least one encrypted symmetric key using at least one private key provided by at least one of the one or more telecom servers, wherein the routing unit selects the one or more telecom servers based on metadata information; and
        decrypt the encrypted message content using the at least one decrypted symmetric key;
    wherein to decrypt the at least one encrypted symmetric key using the at least one private key, the second gateway is further configured to:
        compare hash values received from the first gateway with a hash value of a present public key used by the selected one or more telecom servers;
        decrypt, based on the comparison, the encrypted symmetric key using a present private key corresponding to the present public key when at least one of the hash values received from the first gateway is same as the hash value of the present public key; and
        decrypt, based on the comparison, the encrypted symmetric key using a previous private key corresponding to a previous public key when at least one of the hash values received from the first gateway is same as a hash value of the previous public key.

2. The communication server of claim 1, further comprises:
    a third gateway hosted at the one or more user devices for retrieving at least one of the encrypted messages and decrypted messages from the one or more telecom servers.

3. The communication server of claim 2, wherein the routing unit comprises:
   a memory;
   a processor; and
   at least one interface being operatively coupled to the first gateway, the second gateway, and the third gateway.

4. The communication server of claim 2, wherein the third gateway is configured to receive the encrypted messages from the one or more telecom servers based on the metadata information and decrypt the received encrypted messages.

5. The communication server of claim 4, wherein for decrypting the encrypted messages, the third gateway is configured to:
   decrypt the at least one encrypted symmetric key using at least one private key provided by a selected user device, wherein the user device is selected by corresponding telecom server based on the metadata information; and
   decrypt each encrypted message content using the at least one decrypted symmetric key.

6. The communication server of claim 5, wherein for decrypting the encrypted symmetric key using the at least one private key, the third gateway is configured to:
   compare the hash values received from the first gateway with a hash value of a present public key used by the selected user device;
   decrypt, based on the comparison, the encrypted symmetric key using a present private key corresponding to the present public key when at least one of the hash values received from the first gateway is same as the hash value of the present public key; and
   decrypt, based on the comparison, the encrypted symmetric key using a previous private key corresponding to a previous public key when at least one of the hash values received from the first gateway is same as a hash value of the previous public key.

7. The communication server of claim 2, wherein each of the first gateway, the second gateway, and the third gateway include at least a processor, a hash generation unit, a key generation unit, and an encryption/decryption unit.

8. The communication server of claim 1, wherein the routing unit is configured to push the encrypted messages to the one or more telecom servers without accessing message content of the encrypted messages.

9. The communication server of claim 1, further comprises:
   a key storage unit that is configured to store the at least one public key provided by the one or more user devices, the one or more telecom servers, and the one or more enterprise servers.

10. The communication server of claim 9, wherein for encrypting the at least one symmetric key, the first gateway is configured to:
    determine whether the at least one public key stored in the key storage unit is of the one or more telecom servers or of the one or more user devices; and
    retrieve the at least one public key of one of the one or more telecom servers and the one or more user devices based on the determination.

11. The communication server of claim 10, wherein each of the encrypted messages comprises at least one of encrypted message content, at least one encrypted symmetric key, and hash values of the at least one public key provided by one of the one or more telecom servers and the one or more user devices, wherein each of the encrypted messages is transmitted along with metadata information including a source identification number, an end user identification number, header of the messages, and information about decryption either at the second gateway or at the third gateway, as provided by the routing unit.

12. The communication server of claim 1, wherein the second gateway decrypts the encrypted messages for delivering to the one or more user devices based on the metadata information.

13. The communication server of claim 1, wherein the at least one public key and associated at least one private key generated at one or more enterprise server, and at least one public key and associated at least one private key generated at one or more telecom server, and at least one public key and associated at least one private key generated at one or more user devices are dynamically changed upon a predetermined time.

14. The communication server of claim 1, wherein:
    the second gateway receives delivery receipts corresponding to the transmitted messages and encrypts the delivery receipts;
    the routing unit routes the encrypted delivery receipts from the one or more telecom servers, to the one or more enterprise servers; and
    the first gateway retrieves the encrypted delivery receipts and decrypts the encrypted delivery receipts.

15. The communication server of claim 1, wherein the messages are Application-to-Person (A2P) messages.

16. A method for secured transmission of messages from one or more enterprise servers to one or more user devices, comprising:
    receiving, by a first gateway, the messages from the one or more enterprise servers, wherein the first gateway is hosted at the one or more enterprise servers;
    encrypting the messages, by the first gateway, at the one or more enterprise servers;
    routing, by a routing unit, the encrypted messages from the one or more enterprise servers, to the one or more user devices via one or more telecom servers; and
    retrieving, by the second gateway, the encrypted messages from the routing unit, wherein the second gateway is hosted at the one or more telecom servers;
    wherein encrypting the messages by the first gateway comprises:
        encrypting each message using at least one symmetric key, wherein the at least one symmetric key is generated randomly by the first gateway; and
        encrypting the at least one symmetric key using at least one public key of at least one of one or more telecom servers and the one or more user devices; and
    wherein the encrypted messages are decrypted based on metadata information by the second gateway, wherein decrypting the encrypted messages includes:
        decrypting the at least one encrypted symmetric key using at least one private key provided by at least one of the one or more telecom servers, wherein the routing unit selects the one or more telecom servers based on metadata information; and
        decrypting the encrypted message content using the at least one decrypted symmetric key;
    wherein decrypting the at least one encrypted symmetric key using the at least one private key comprises:
        comparing hash values received from the first gateway with a hash value of a present public key used by the selected one or more telecom servers;
        decrypting, based on the comparison, the encrypted symmetric key using a present private key corresponding to the present public key when at least one of the hash values received from the first gateway is same as the hash value of the present public key; and decrypting, based on the comparison, the encrypted symmetric key using a previous private key corresponding to a previous public key when at least one of the hash values received from the first gateway is same as a hash value of the previous public key.

17. The method of claim 16, wherein at least one of the encrypted messages and the decrypted messages is retrieved by the one or more user devices from the one or more telecom servers using a third gateway.

18. The method of claim 17, further comprising decrypting the encrypted messages at the one or more user devices by the third gateway based on the metadata information, wherein decrypting the encrypted messages comprises:

decrypting, by the third gateway, the at least one encrypted symmetric key using at least one private key provided by a selected user device, wherein the user device is selected by corresponding telecom server based on the metadata information; and decrypting, by the third gateway, each encrypted message content using the at least one decrypted symmetric key.

19. The method of claim 18, wherein decrypting the encrypted symmetric key using the at least one private key comprises:

comparing the hash values received from the first gateway with a hash value of a present public key used by the selected user device;

decrypting, based on the comparison, the encrypted symmetric key using a present private key corresponding to the present public key when at least one of the hash values received from the first gateway is same as the hash value of the present public key; and decrypting, based on the comparison, the encrypted symmetric key using a previous private key when at least one of the hash values received from the first gateway is same as the hash value of a previous public key.

20. The method of claim 16, wherein the at least one public key provided by the one or more user devices, the one or more telecom servers, and the one or more enterprise servers are stored in a key storage unit, wherein encrypting the at least one symmetric key comprises:

determining whether the at least one public key contained in the key storage unit is of the one or more telecom servers or of the one or more user devices; and retrieving the at least one public key of the one of the one or more telecom servers and the one or more user devices based on the determination.

21. The method of claim 20, wherein each of the encrypted messages comprises at least one of encrypted message content, at least one encrypted symmetric key, hash values of the at least one public key provided by one of the one or more telecom servers and one or more user devices, wherein each of the encrypted messages is transmitted along with a metadata information including a source identification number, an end user identification number, header of the messages, and information about decryption either at the second gateway or at the third gateway, as provided by the routing unit.

22. The method of claim 16, further comprising decrypting the encrypted messages by the second gateway for delivering to the one or more user devices based on the metadata information.

23. The method of claim 16, further comprising, wherein the at least one public key and associated at least one private key generated at one or more enterprise server, and at least one public key and associated at least one private key generated at one or more telecom server, and at least one public key and associated at least one private key generated at one or more user devices are dynamically changed upon a predetermined time.

24. The method of claim 16, further comprises:

receiving, by the second gateway, delivery receipts corresponding to the transmitted messages;

encrypting, by the second gateway, the delivery receipts;

routing, by the routing unit, the encrypted delivery receipts from the one or more telecom servers, and the one or more enterprise servers; and retrieving, by the first gateway, the encrypted delivery receipts and decrypting the encrypted delivery receipts.

25. A non-transitory computer-readable storage medium that stores instructions executable by a computer that, in response to execution by the computer, cause the computer to perform or control performance of operations, comprising:

receiving messages from one or more enterprise servers, wherein the messages are received and encrypted by a first gateway hosted at the one or more enterprise servers;

routing the encrypted messages from the one or more enterprise servers, to one or more user devices via one or more telecom servers; and retrieving the routed encrypted messages by the second gateway, wherein the second gateway is hosted at the one or more telecom servers;

wherein encrypting the messages by the first gateway comprises:

encrypting each message using at least one symmetric key, wherein the at least one symmetric key is generated randomly by the first gateway; and encrypting the at least one symmetric key using at least one public key of at least one of one or more telecom servers and the one or more user devices; and wherein the encrypted messages are decrypted based on metadata information by the second gateway, wherein decrypting the encrypted messages includes:

decrypting the at least one encrypted symmetric key using at least one private key provided by at least one of the one or more telecom servers, wherein the routing unit selects the one or more telecom servers based on metadata information; and decrypting the encrypted message content using the at least one decrypted symmetric key;

wherein decrypting the at least one encrypted symmetric key using the at least one private key includes:

comparing hash values received from the first gateway with a hash value of a present public key used by the selected one or more telecom servers;

decrypting, based on the comparison, the encrypted symmetric key using a present private key corresponding to the present public key when at least one of the hash values received from the first gateway is same as the hash value of the present public key; and decrypting, based on the comparison, the encrypted symmetric key using a previous private key corresponding to a previous public key when at least one of the hash values received from the first gateway is same as a hash value of the previous public key.

* * * * *